C. W. SQUIRES.

3 Sheets—Sheet 1.

LOCK.

No. 11,564.

Reissued Aug. 18, 1896.

WITNESSES:

Thomas P. Simpson

Geo. H. Snyder.

INVENTOR

C. W. Squires,

BY

Chapin & Co.

ATTORNEYS.

C. W. SQUIRES.

3 Sheets—Sheet 2.

LOCK.

No. 11,564.

Reissued Aug. 18, 1896.

WITNESSES:

Thomas P. Simpson,

Geo. H. Snyder.

INVENTOR

C.W. Squires,

BY Chapin & Co.

ATTORNEYS.

C. W. SQUIRES. 3 Sheets—Sheet 3.

LOCK.

No. 11,564. Reissued Aug. 18, 1896.

WITNESSES:

Thomas P. Simpson.

Geo. H. Snyder

INVENTOR

C. W. Squires,

BY

Chapin & Co.

ATTORNEYS.

UNITED STATES PATENT OFFICE.

CHARLES W. SQUIRES, OF SPRINGFIELD, MASSACHUSETTS.

LOCK.

SPECIFICATION forming part of Reissued Letters Patent No. 11,564, dated August 18, 1896.

Original No. 554,965, dated February 18, 1896. Application for reissue filed May 21, 1896. Serial No. 592,489.

*To all whom it may concern:*

Be it known that I, CHARLES W. SQUIRES, a citizen of the United States, residing at Springfield, in the county of Hampden and State of Massachusetts, have invented certain new and useful Improvements in Locks; and I do hereby declare the following to be a full, clear, and exact description of the invention, such as will enable others skilled in the art to which it appertains to make and use the same, reference being had to the accompanying drawings, and to the letters and numerals of reference marked thereon, which form a part of this specification.

This invention relates to locks for doors and analogous uses, and more particularly to the description of locks termed "night-latch" locks, the object being to provide an improved lock of this class; and the invention consists in the improved details of lock construction, all as hereinafter fully described.

Figure 2:
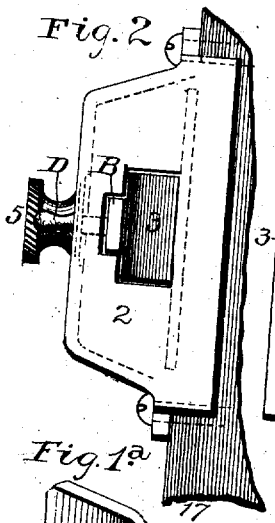
Figure 1:
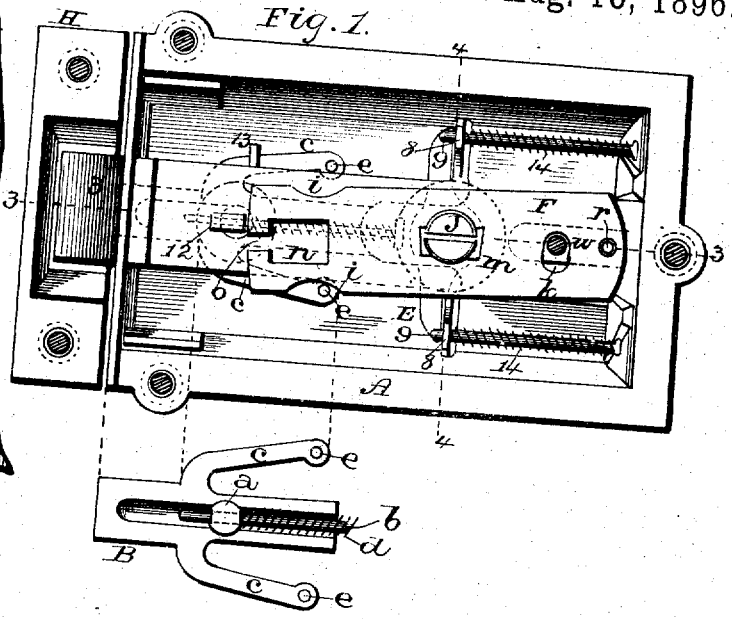
Figure 1A:
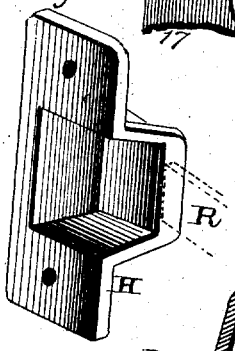
Figure 3:
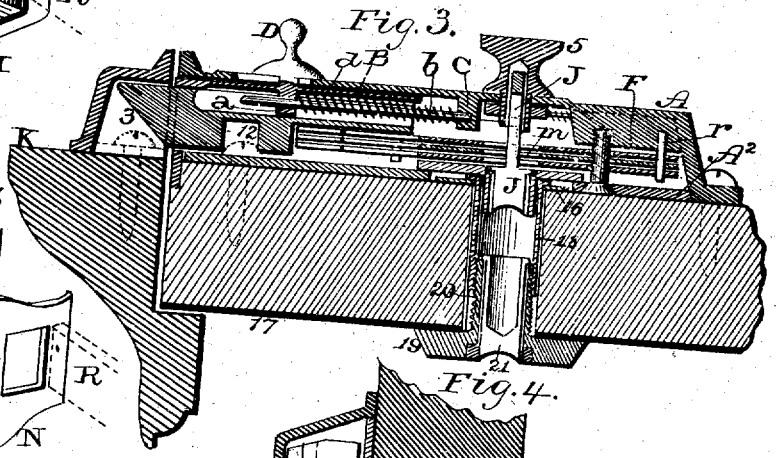
Figure 1B:
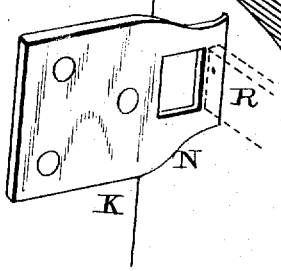
Figure 4:
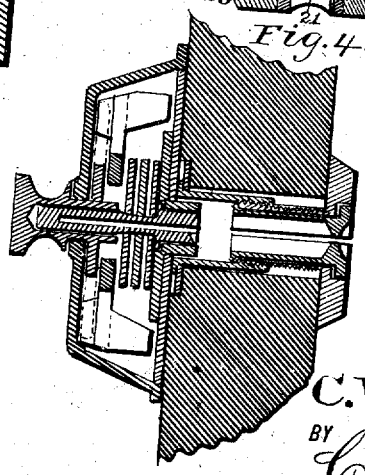
Figure 5:
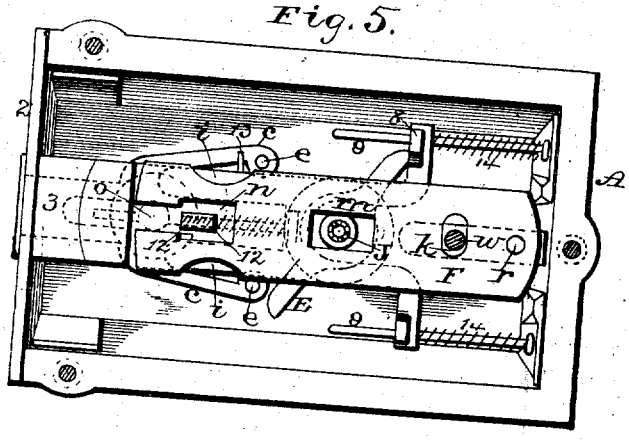
Figure 6:
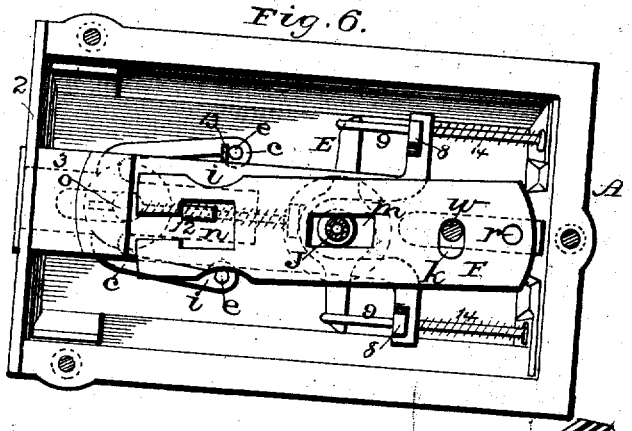
Figure 7:
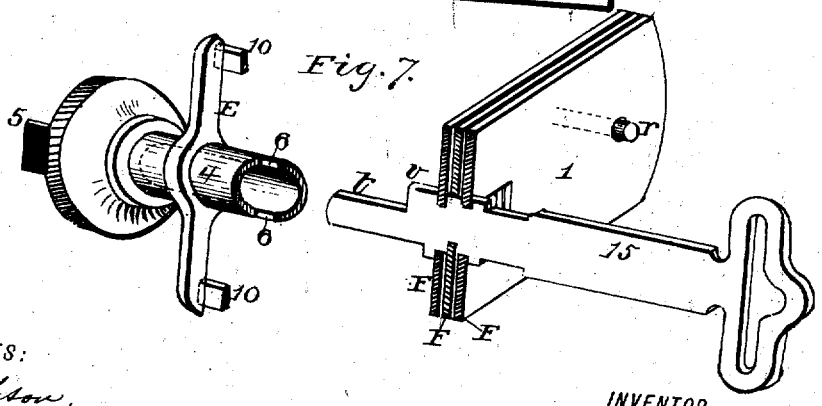
Figure 8:
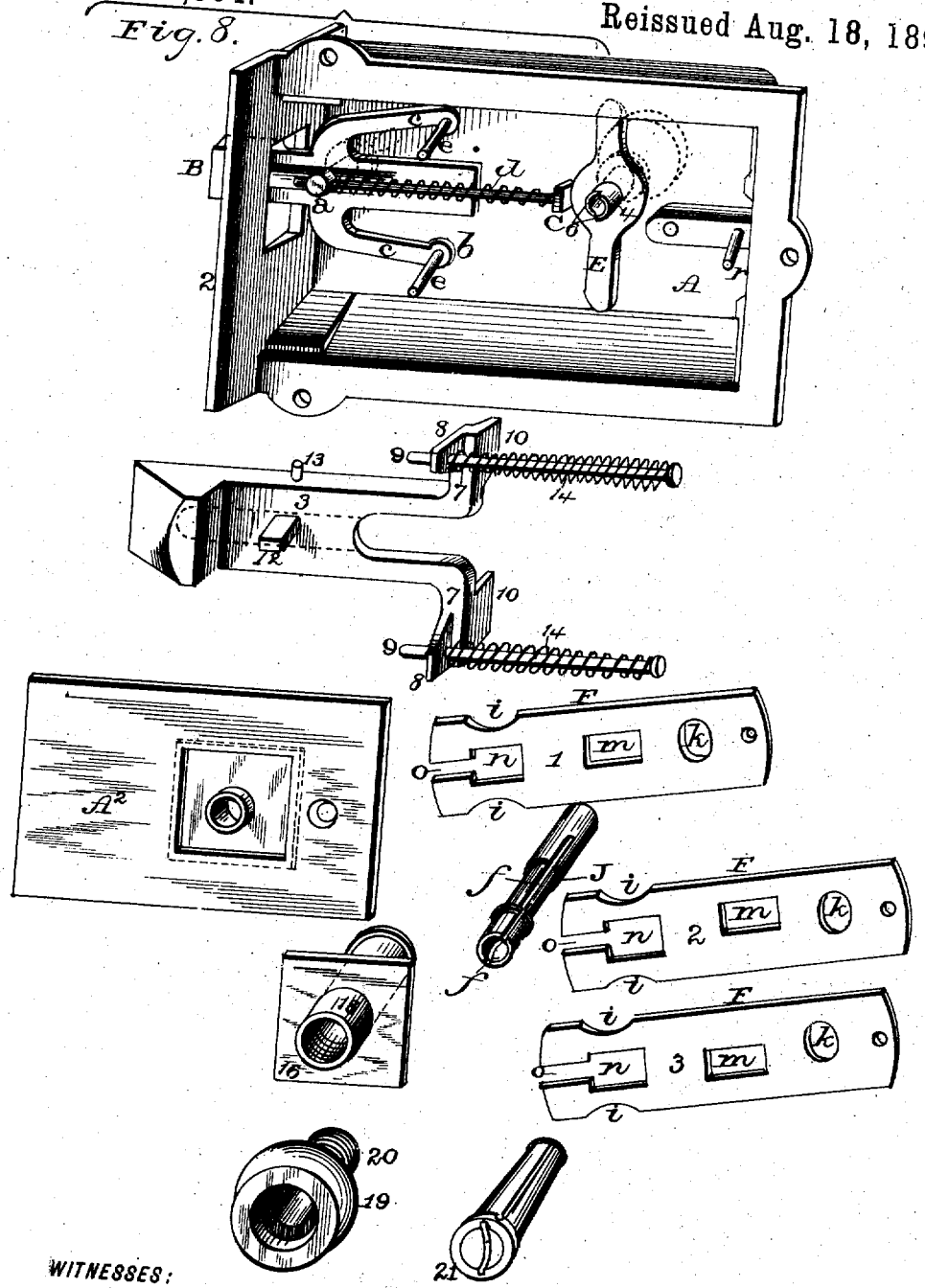

In the drawings forming part of this specification, Figure 1 is a rear side elevation of a lock-case and lock mechanism therein contained embodying my improvements, said figure also showing a detail part of the lock in side elevation and the plate which receives the outer end of the bolt. Fig. $1^a$ is a perspective view of said bolt-receiving plate, this figure indicating in dotted lines the operative position of a lock part below described. Fig. $1^b$ is a perspective view of a plate having an opening therethrough to receive the end of the bolt. Fig. 2 is a front end view of the lock, a part of a door to which the lock may be secured being shown in this figure. Fig. 3 illustrates sections of a door and door-jamb and the lock and bolt-receiving plate thereon in section on line 3 3, Fig. 1, this figure illustrating also the escutcheon for the lock in section. Fig. 4 is a sectional view of the lock on line 4, Fig. 1, and a part of a door and the escutcheon therein. Figs. 5 and 6 are similar views of the lock to that shown in Fig. 1, but showing the mechanism thereof in different operative positions. Fig. 7 is a perspective view of the key and of detail parts of the lock hereinafter described. Fig. 8 embraces, in perspective views, the case and detail parts of the lock mechanism, and including the parts in detail of the escutcheon as below described.

In the drawings, A indicates the lock-case, $A^2$ being the removable back plate thereof, and 2 the face-plate at one end thereof, through which the outer end of the main bolt 3 projects.

B indicates a tumbler-setting bolt, and *c c* arms thereon; *e e*, studs on said arms, and *a* a perforated post on one side of bolt B.

C is a projecting stud on the inner surface of the lock-case A, and *b* is a spring-supporting rod having one end abutting against said stud C, and its opposite end extends freely through the perforation in said post. A coiled spring *d* is placed on said rod *b*, and is normally more or less compressed between said post *a* and stud C and acts to slide bolt B outwardly through plate 2.

D is a knob having a shank extending through the lock-case A and fixed in or to bolt B.

The bolt 3 of the lock is constructed as shown in perspective view among the parts of the lock in Fig. 8, and its place therein is that illustrated in Figs. 5 and 6. A two-armed lever E occupies a position in the lock under said bolt 3, and is fixed on the hollow shank 4 of an operating-knob 5, said shank having a section of its inner end cut off to form two shoulders 6 6 thereon, with which the key engages for the operation of said bolt 3 thereby, as below described. The said bolt 3 has two wings 7 7 extending laterally from the opposite edges thereof, each of said wings having a lip 8 thereon perforated to receive the end of a spring-sustaining rod 9 and a lip 10 for engagement with one arm of said lever E. Bolt 3 has also a stud or ward 12 thereon for operation in connection with the tumblers of the lock, and a pin or stud 13 on one edge for engagement with the said bolt B, all as below described. Springs 14 are supported on said rods 9, which act to shoot bolt 3 outwardly, said rods abutting by one end against the lock-case, as shown in Figs. 1, 5, and 6. The said bolt B, located between bolt 3 and the side of the case A, and also the latter-named bolt, are both properly supported for independent and for coinciding sliding movements, as and for the purposes below described. The said laterally-projecting pin 13 on bolt 3 is for engagement with one of the studs *e* on an arm *c* of the bolt B, to the end that when said bolt 3 is drawn into the lock by the action of the two-armed lever E, or otherwise, bolt B must take a like position.

The tumblers F of the lock, made from suitable metal plates, of any desired number, (three being herein shown,) are of oblong form, and are pivoted by pivot-stud *r* to the lock-case. Each tumbler has the edge recesses *i i*, the longitudinal slot *o* in its frame end, and the opening *n* at the inner end of said slot, and a key-opening *m* through it. Said recesses, slots, and openings *n* in the tumblers are substantially in the same positions in each of them.

The key-engaging borders of the openings *m* in the tumblers F (see Figs. 7 and 8) are in each tumbler arranged preferably at different distances from a longitudinally-central line drawn from the center of the tumbler-pivot *r* to a point centrally between the borders of the slot *o* in the free end of the tumbler. The said variation of the positions of the parts of the tumblers which the key 15 engages provides convenient means for effecting innumerable changes in tumblers and keys, whereby greater security against the unauthorized operation of the lock is obtained. The operative positions of said tumblers in the manipulation of the lock are those shown in Figs. 1, 5, and 6. Fig. 5 shows them supported in a horizontal position by engagement with one of the studs *e* on an arm of the bolt B. Figs. 1 and 6 show them with their free ends dropped by gravity to a different position, the first to one by which the bolt is locked in an outward one, and the second one by which the bolt is locked in an inward position.

A key-guiding post J, Fig. 8, having a longitudinal slot *f* therein, passes through said key-openings *m* in the tumblers, and one end thereof enters the inner end of the said hollow shank 4 of the knob 5, Figs. 4 and 7. Said post J has a diameter within the key-openings *m* of the tumblers of less extent than the width of that part of the key 15 lying between the edges thereof, which are engaged by the tumblers, to the end that said key has a clear engagement with said tumblers. Said key when put into the lock has its extremity *t* entering very nearly to the bottom of the slot in said post J, (see Fig. 4,) and thereby bringing the projection *v* on one side of the key (see Fig. 7) to a position in the lock whereby it will, when turned to lift the tumblers, engage one of the shoulders 6 6 on said hollow shank 4, and thus turn the latter and the lever E thereon to bring said lever against one of the lips 10 on bolt 3, and thus draw back said bolt. The turning of the key to operate lever E, as aforesaid, causes the tumblers to be brought to the positions shown in Fig. 5, whereby the slots *o* in the tumblers are all free to allow the ward 12 on bolt 3 to enter them and permit the bolt to move back.

The escutcheon and key-guiding parts which are adapted for use with locks of this class are illustrated in Figs. 3, 4, and 8, wherein 16 is a metal washer applied between the lock and the door 17. 18 is a tube passing through said washer and having a flange on its inner end engaging therewith. The said tube 18 has its outer end internally screw-threaded, as shown. The escutcheon-plate 19 has the tube 20 fixed in its inner side, which is exteriorly screw-threaded for engagement with the interior of said tube 18. A key-guiding barrel 21, which is longitudinally slotted to receive the key 15, is fitted closely into said tube 20, whereby it is held in place therein, but can be turned by the key when the latter is entered into said post J for operating the tumblers, as above set forth.

The above-described escutcheon parts, and particularly the screw-connected tubes 18 and 20, provide convenient means for adjusting the same to doors of varying thicknesses, and for firmly securing the escutcheon to a door by turning the plate 19 and screwing tube 20 into tube 18, so that said plate 19 remains fixed in proper position to receive a key.

The tumblers F have an aperture *k* through them for permitting a screw *w* to be inserted, which secures the back plate $A^2$ of the lock-case to the latter.

H indicates the usual bolt-plate on the door-jamb K. The lock may, if desired, be used with an ordinary perforated plate N, secured to said door-jamb, as illustrated in Fig. $1^b$.

The dotted diagrams R in Figs. $1^a$ and $1^b$ indicate the position of the end of the bolt B as abutting against the face of the plate in the door-jamb, while the end of the bolt 3 is in engagement with plate H or N. The said abutment or bolt B against the jamb-plate, as aforesaid, while the outer end of the bolt is in a locked position in said plate, as in Fig. 1, results in bringing the studs *e* on the arms *c* of the bolt B to the position relative to the recesses *i* in the borders of the tumblers shown in Fig. 1, thus permitting the tumblers to drop behind the ward 12 on bolt 3 and retain said bolt in said locked position.

When the door on which the lock is secured is open, the outer end of bolt 3 normally projects beyond the face-plate 2 of the lock, as in ordinary spring-locks, actuated by the springs 14, and at the same time the outer end of bolt B likewise projects, by the action of spring *d*, beyond the surface of said plate 2; but under said conditions bolts 3 and B, the studs *e* on the arms *c* of bolt B are brought to a position forward of the recesses *i* in the edges of the tumblers, thereby sustaining their free ends all in line, so that bolt 3 may have a free rearward motion when the end thereof strikes the jamb-plate H in shutting the door. The door is thereby locked, but said inward movement of the locking-bolt 3 causes the engagement of the pin 13 on said last-named bolt with one of the studs *e* on an arm *c* of bolt B, whereby the said studs *e* are brought to the positions relative to the recesses *i* in the tumblers shown in Fig. 1, letting the ends of the tumblers drop behind the said ward 12 on the bolt 3, thereby locking the latter in its outward position. The door may now be unlocked from the inside by drawing bolt B and studs *e* farther backward through knob D to the position shown in Fig. 5, and then turning knob 5 to operate lever E, or the door may be unlocked from the outside by the key 15 operating the tumblers and shank 4 and lever E, as aforesaid.

The bolts 3 and B may both be secured in the positions shown in Fig. 6, wherein neither bolt projects beyond the face of the plate 2, by pushing said bolts inwardly by applying the fingers directly thereto, or by operating the lever E by knob 5 or by key 15. After the last-named adjustment, if desired, bolt 3 may be released by moving bolt B, through knob D, farther backward, as in Fig. 5, thereby, through studs *e*, (one or both,) bringing slots *o* in the ends of the tumblers into such position relative to ward 12 on bolt 3 that the said ward is disengaged from the tumblers.

Having thus described my invention, what I claim, and desire to secure by Letters Patent, is—

1. In a lock, a latching-bolt, and a tumbler-setting bolt, combined with a series of key-operated tumblers operated by said setting-bolt to lock the latching-bolt in position, substantially as shown.

2. In a lock, a latching-bolt, and a tumbler-setting bolt having an independent movement of the latching-bolt, and which setting-bolt is forced inwardly by the bolt-plate when the latching-bolt is in engagement therewith, combined with a series of key-operated tumblers that are pivoted in the lock-frame, and have a rising and falling movement at their front ends, and which tumblers are made to lock the latching-bolt in engagement with the bolt-plate when the setting-bolt is forced inwardly thereby, substantially as described.

3. In a lock, a spring-actuated latching-bolt, and a spring-actuated tumbler-setting bolt, having an independent movement of its own, and placed side by side with the latching-bolt, so that both will be operated by the latching-plate, combined with pivoted key-operated tumblers which are operated by the setting-bolt, and means by which the tumblers are made to engage with the latching-bolt so as to lock it in position, substantially as specified.

4. In a lock, a spring-actuated latching-bolt provided with a stud or ward, and a spring-actuated tumbler-setting bolt, that is adapted to have both an independent movement of its own and a back-and-forth movement with the latching-bolt, combined with a series of key-operated tumblers, pivoted at their inner ends, and having recesses in their outer ends, and which tumblers are operated by the setting-bolt, so as to lock the latching-bolt in engagement with the latching-plate when the setting-bolt is forced inward thereby, substantially as shown.

5. In a lock of the class described, a group of tumblers pivoted by one end and arranged side by side having longitudinally-slotted free ends, each tumbler having a rectangular opening therein at the inner end of said slot, and having recesses in the opposite edges thereof, combined with a sliding tumbler-setting bolt having studs extending across the opposite edges of said tumblers in proximity to the said recesses in the borders thereof, said tumbler-setting bolt having an engagement with the door-jamb when the lock is in proximity thereto, combined with a spring acting to move said tumbler-setting bolt outwardly of the lock-case, a main bolt having a ward thereon for entering all of said tumbler-slots simultaneously, and engaging with the border of said rectangular opening, when said main bolt is moved into the lock-case one or more springs acting to move said main bolt outwardly of the lock-case, and a lever connected with a knob outside of the lock-case, for drawing said last-named bolt into the lock-case, substantially as set forth.

6. In combination the main bolt 3, having a stud 13, projecting from one edge thereof, combined with springs for moving said bolt outwardly of the lock-case, and the tumbler-setting bolt B, having studs *e* thereon, one thereof having engagement with said stud 13, a spring acting to move said bolt B, outwardly of the case, and a lever operated from outside of the case and engaging with said bolt 3, whereby the latter is drawn into the lock-case, substantially as set forth.

7. In combination the hollow shank 4, of the knob 5, having a lever thereon for operating the main bolt, and having the shoulders 6, 6, on said shank, combined with the tumblers, a key-guiding post extending through the key-openings in said tumblers, and entering said shank and having a longitudinal slot therein to receive the key and the key having wards thereon for engaging the borders of said key-openings, and a projection for engaging one of said shoulders 6, 6, substantially as set forth.

8. The hollow shank 4, the knob 5, having lever E, thereon and the shoulders 6, 6, on said shank, combined with the key-guiding post J, entering said shank, and having a key-slot therein, the escutcheon-plate 19, having the screwed tubular part 20 thereon, and the key-guiding barrel 21, fitted thereinto, the tube 18, having a screw engagement with said tube 20, and the metal washer 16, engaged by one end of said tube 18, substantially as set forth.

9. In combination a door having a lock secured thereto, and containing the key-guiding post J, a metal washer 16 surrounding said post, and intermediate of the lock and the door a tube 18, having a flange engagement by one end with said washer and internally screw-threaded, the escutcheon-plate 19, having an externally-screw-threaded tube 20 fixed thereon, and engaging with said tube 18 and the key-guiding barrel 21, fitted in said escutcheon-plate, and its connected tube 20, substantially as set forth.

In testimony whereof I affix my signature in presence of two witnesses.

CHARLES W. SQUIRES.

Witnesses:
H. A. CHAPIN,
K. I. CLEMONS.